Nov. 12, 1963   H. J. BUTLER   3,110,364
AUTOMATIC ADJUSTING DEVICES FOR BRAKES, CLUTCHES AND THE LIKE
Filed June 2, 1960   3 Sheets-Sheet 2
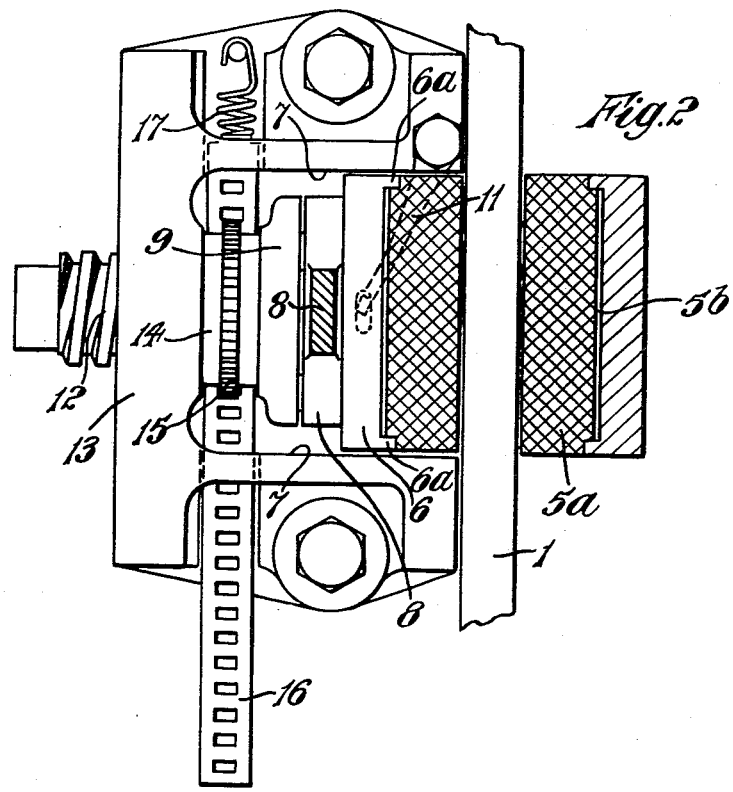
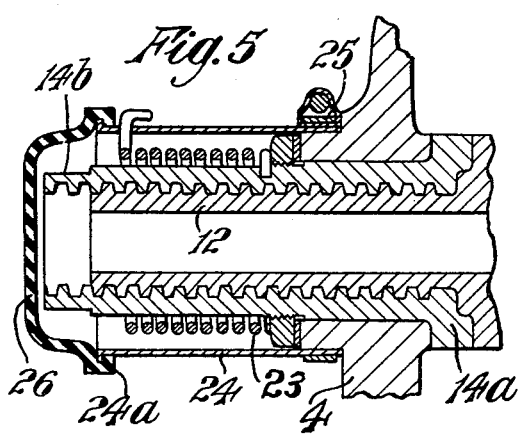
INVENTOR
Henry James Butler
by Benj. T. Rauber
his attorney.

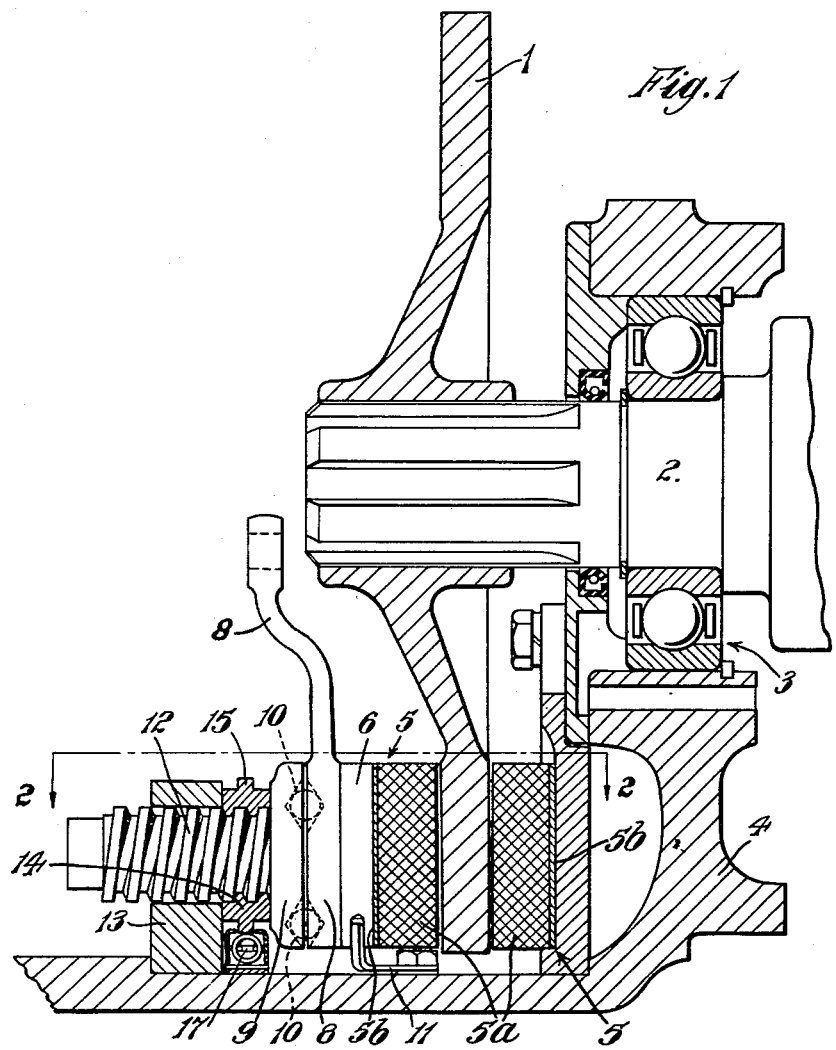

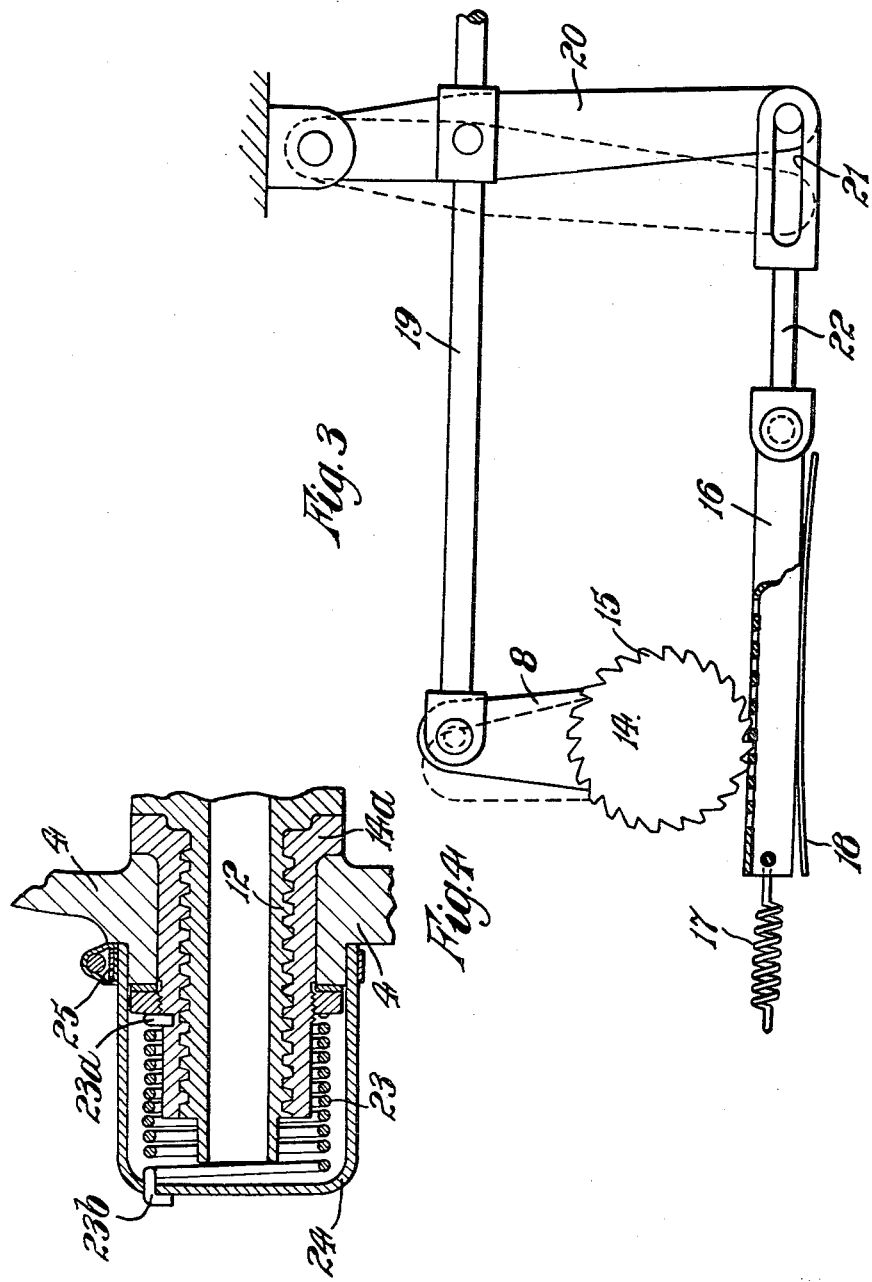

3,110,364
AUTOMATIC ADJUSTING DEVICES FOR BRAKES, CLUTCHES AND THE LIKE
Henry James Butler, Sutton Coldfield, England, assignor to Dunlop Rubber Company Limited, London County, England, a British company
Filed June 2, 1960, Ser. No. 33,431
9 Claims. (Cl. 188—73)

This invention relates to automatic adjusting devices for brakes or clutches and more particularly relates to improved adjusting devices for disc brakes.

The object of the invention is to provide a simple, reliable automatic adjustment device for a brake or clutch. A further object of the invention is to provide a brake, clutch or the like incorporating such an improved automatic adjusting device.

According to the invention an automatically adjusting wear compensation device for a brake or clutch friction element comprises a nut associated with one part of a brake or clutch housing and adapted to be rotated about its own axis by the action of an energised spring and to be restricted from relative movement in its own axial direction by said part, and having associated at one end thereof said friction element, and a threaded member adapted to move progressively on rotation of said nut to compensate for wear of said friction element.

Preferably the threaded member is moved to compensate for wear on the disengagement stroke of the brake or clutch, and the spring means is restrained from moving the threaded member to an unlimited extent by the abuttal of the friction element or its backing plate against a retraction device.

In one preferred embodiment of the invention the nut is formed with ratchet teeth on its outer periphery and these co-act with a spring loaded rack which tends to rotate the nut. The spring means in this case is a helical spring in tension between the rack and a fixed part of the brake. The adjustment device is reset by pulling the rack to re-engage the teeth of the ratchet at a different place on the rack. Alternatively the resetting may be carried out continuously by a mechanical linkage associated with the brake applying mechanism.

In a second preferred embodiment of the invention the spring means comprises a coil spring in torsion between the nut and a stationary part of the brake or clutch. Resetting of this adjusting device is accomplished by disengaging the connection of the spring to the stationary part and winding the nut to its reset position and then re-engaging the connection.

According also to the invention a brake or clutch comprises a rotatable disc, at least one pad of friction material axially movable into frictional engagement therewith, an axially movable mechanism to effect said engagement therewith, a nut associated with one part of the brake or clutch housing and adapted to be rotated about its own axis by the action of an energised spring and to be restricted from relative movement in its own axial direction by said part, a threaded member screwed into said nut and having associated at one end thereof said friction element.

The invention will now be described with reference to the accompanying drawings of which:

FIGURE 1 is a section through a disc brake fitted with an automatic adjusting device according to the first embodiment, FIGURE 2 is a cross-section on line 2—2 of FIGURE 1, FIGURE 3 is a diagrammatic drawing of an automatic adjuster device adapted to be continually reset.

FIGURES 4 and 5 are cross-sections through automatic adjusting devices according to the second embodiment of the invention.

A disc brake and adjuster as illustrated in FIGURES 1 and 2 comprises a rotatable disc 1 splined to a shaft 2 which it is intended to brake. The shaft 2 is supported for rotation on bearings 3 one of which is shown mounted in the brake supporting structure 4. A friction pad 5a with its associated backing plate 5b forms a friction pad assembly 5 and one of these is detachably secured to the supporting structure 4 adjacent to and axially aligned with a braking face of the disc and the other of said friction pad assemblies 5 positioned on the opposite side of the disc. The other friction pad assembly 5 is movable to engage its associated braking surface of the disc and to move said disc 1 axially on its splines to engage the associated braking surface of the disc with the friction pad 5a secured to the support structure 4.

The movable friction pad assembly 5 is detachably secured to a guide member 6 which carries projections 6a, FIG. 2, to engage with complementary recesses in the friction pad assembly 5 and which is adapted to move in guides 7 in the supporting structure 4. One side face of a lever 8 abuts the guide plate 6 and on the other side face shallow conical recesses are formed. A thrust member 9 having a similar set of conical recesses on one face is adapted to be spring loaded against balls 10 located in the aligned recesses in both thrust member 9 and lever 8. A pad retraction member 11 retracts the friction pad assembly a predetermined distance after every brake application. The pad retraction member is known in the art, its construction having been described in British patent to Dunlop No. 883,417, published Nov. 29, 1961 and corresponding French Patent No. 1,207,766. Its action, as described in said British patent is to permit the friction pads to advance a limited distance, normally sufficient to apply the brakes without deforming the element 11 (elements 19 of the patent). If a movement of the friction pads beyond this limited distance is required to apply the brakes, the arm 11 is deformed, permitting the application of the brakes, and upon release of the brakes, the resilience of the arms causes them to spring back a slight distance, for example 0.005″ to 0.010″ to withdraw the friction pads clear of the disc.

The automatic adjuster part of the brake comprises a screw 12 which passes through a thrust block 13 which is secured to or integral with the support structure 4 for the brake. The screw 12 is secured to the thrust member 9. Interposed between the block 13 and thrust member 9 on the screw 12 is a nut 14, the outer periphery of which is formed with teeth 15 as shown in FIGURE 3. The teeth 15 engage a rack 16 which is spring loaded by a coiled helical spring 17 secured to the rack 16 and to the support structure 4.

The spring loading on the rack 16 is in such a direction as to constantly urge the nut 14 to advance the friction pad 5a towards the disc 1. The rack 16 is also pressed on to the nut 14 by a single leaf spring 18 bowed upwards between its ends as shown in FIGURE 3. The shape of the teeth 15 is such as to allow the rack 16 to be moved in the direction to retension the helical spring 17 without the nut 14 turning.

As wear of the pads 5a takes place the rack 16 moves to rotate the nut 14 and advance the screw 12, thrust member 9, lever 8, guide member 6, and friction pad assembly 5 towards the disc thereby taking up slack movement. The take-up occurs on the release stroke of the brake that is, when the lower end of the lever 20 and the rack 16 moves to the left as viewed in FIG. 3. This take up is independent of the spring 11 and merely advances the nut 14 so that the thrust member is brought up to the clearance provided by the spring 11 so that on the next application of the spring the rod 19 need move only a distance corresponding to this clearance. It may happen that the rack 16 will have to be reset manually several times during the life of the friction pad 5a. This can be done simply by pulling the rack 16, until it projects from the structure 4 to its fullest extent.

In the refinement of the adjuster device shown in FIGURE 3, the brake operating rod 19 operates the linkage 20 one end of which is pivoted to a fixed support and the other slides in a lost motion slot 21 in a member 22 attached to the rack 16. To apply the brake the rod 19 is moved to the right as viewed in FIG. 3. As the rack 16 moves under the action of the helical spring 17 it rotates the toothed nut 14, and is pulled back at every application by the linkage 20 until wear is such as to engage a hole in the rack 16 with the next tooth. Thus continuous automatic resetting of the device is achieved.

The embodiments shown in FIGURES 4 and 5 illustrate an adjuster device in which the nut 14a is elongated and is journalled on the support structure 4 and is rotated directly by a coiled helical spring 23 in torsion. The nut 14a is freely rotatable in its bearing and is restrained from axial movement.

In FIGURE 4 one end 23a of the tension spring 23 engages with the nut 14a and the other end 23b with a cup-shaped cover 24 secured to the support structure 4 by a worm drive clip 25. In order to energise the spring 23 the clip 25 is slackened and the cover 24 is rotated by hand through a suitable angle, whereupon the clip 25 is tightened to secure the cover 24 to the support structure 4. When it is desired to replace worn pads the cover 24 may be rotated in the opposite direction to reset the screw 12.

The adjuster of FIGURE 5 differs from that of FIGURE 4 only in that the cover 24 is open at both ends, and the nut 14a is provided with flats 14b at its outer end to enable it to be turned with a spanner for resetting purposes. A rubber dust cap 26 engages with a narrow flange 24a on the cover tube 24.

In both of FIGURES 4 and 5 the nut 14a on rotation advances the screw 12 to take up slack caused by wear of the friction pads 5a.

The adjusters described are easily manufactured and the operation is simple. The adjusters of FIGURES 1, 2, 4 and 5 are automatic over a limited range and can easily be reset, while the adjuster of FIGURE 3 is entirely automatic throughout the life of the friction pad.

Having now described my invention, what I claim is:

1. A disc brake comprising a rotatable axially movable disc, a fixed friction element on one side of said disc, an axially movable friction element on the other side of said disc axially aligned with said fixed friction element, a supporting structure adjacent said disc on which said fixed friction element is mounted on one side of said disc and comprising a guide on the opposite side of said disc in which said movable friction element is mounted to move axially into and out of frictional engagement with said disc, a nut rotatably mounted in fixed axial position on said supporting structure, a non-rotatable, axially movable, threaded member having screw threads engaging the threads of said nut and movable axially on rotation of said nut, a thrust member integral with said threaded member and axially aligned with said friction elements, a brake operating lever pivotally mounted between said thrust member and said movable friction element mounted in said guides, the opposed faces of said lever and thrust member having opposed ramped recesses, balls located between said ramped recesses whereby angular movement of the lever in one direction causes axial movement of said movable friction element to frictional engagement with said disc, a retraction mechanism on said supporting structure to withdraw said movable friction element a limited distance from said disc upon return of said lever from brake applying position, and spring means mounted at one end on said supporting structure and connected at its opposite end to said nut to rotate said nut in a direction to advance said thrust member progressively toward said friction element on the return stroke of said lever as said friction pads wear.

2. The brake of claim 1 in which said spring means is a helical torsion spring and in which said brake comprises a bearing on said supporting structure in which said nut is journaled, and an element on said structure secured to the other end of said spring and rotatable to positions to maintain torsion on said spring.

3. The brake of claim 2 in which said element to maintain torsion comprises a sleeve enclosing said spring and rotatable on the axis of said spring and means to secure said sleeve in positions of adjustment.

4. The brake of claim 3 which comprises a clip to secure said sleeve in adjusted positions on said supporting structure.

5. The brake of claim 4 in which said nut has flattened surfaces to be engaged by a tool to reset it on replacement of a friction pad and said sleeve has a removable cover to provide access to said flattened surfaces.

6. The disc brake of claim 1 further comprising means driven by said brake actuating means to maintain tension on said spring means as said nut is rotated during the wear of said brake elements.

7. An automatic adjusting wear compensating device for disc brakes which comprises a supporting structure, a nut rotatably mounted in fixed axial position on said supporting structure, a thrust member having screw threads engaging the threads of said nut and non-rotatably and slidably mounted on said supporting structure to advance toward a brake disc of said brake upon rotation of said nut and comprising a thrust element mounted on the advancing end of the thrust member to support the reactive force of a brake applying means, a thrust receiving and guide element spaced in advance of said thrust member to receive the force of a brake applying means connected to said thrust member, a retraction member mounted on said supporting structure to retract thrust receiving and guide element a limited distance upon release of the brakes, and spring means to rotate said nut to advance the thrust element to bring a brake applying means connected to said thrust element into contact with said retracted thrust receiving and guide element.

8. A device according to claim 7 wherein said nut is formed with ratchet teeth on its outer periphery, and the means actuated by said brake applying means comprises a rack disposed tangentially to the periphery of the nut and engaging the teeth thereof and wherein said spring is a coiled helical spring in tension and is mounted to urge the rack in a direction to rotate the nut to advance said screwed member to compensate for wear of said friction elements, the ratchet teeth being so formed as to allow the rack to be moved to re-tension the coiled helical spring, and comprising a leaf spring biasing said rack to engage the teeth of the ratchet.

9. A device as claimed in claim 7 wherein a retraction mechanism for said friction elements is provided and said threaded member is restrained from unlimited movement by said retraction mechanism, said spring means being insufficiently strong to rotate said nut to move said threaded member so as to permanently deflect said retraction mechanism.

References Cited in the file of this patent

UNITED STATES PATENTS

| | | |
|---|---|---|
| 2,160,752 | Oliver | May 30, 1939 |
| 2,216,861 | Swift | Oct. 8, 1940 |
| 2,612,969 | Hawley | Oct. 7, 1952 |
| 2,669,327 | Chamberlain et al. | Feb. 16, 1954 |
| 2,820,530 | Chouings et al. | Jan. 21, 1958 |
| 2,835,350 | Butler | May 20, 1958 |